United States Patent [19]
Henderson

[11] 3,989,803
[45] Nov. 2, 1976

[54] CONCENTRATION OF CARBONACEOUS SOLIDS IN FUEL OIL STREAM IN A CARBON BLACK PROCUS

[75] Inventor: Eulas W. Henderson, Oregon, Ohio

[73] Assignee: Phillips Petroleum Company, Bartlesville, Okla.

[22] Filed: June 23, 1975

[21] Appl. No.: 589,318

[52] U.S. Cl. .............................. 423/450; 23/259.5; 423/456
[51] Int. Cl.² .......................................... C09C 1/50
[58] Field of Search ........... 423/449, 450, 455, 456, 423/458; 23/259.5

[56] References Cited
UNITED STATES PATENTS

| | | |
|---|---|---|
| 2,901,324 | 8/1959 | Howell .............................. 423/450 |
| 3,073,681 | 1/1963 | Ceresna ............................. 423/450 |
| 3,211,532 | 10/1965 | Henderson ..................... 423/455 X |
| 3,342,556 | 9/1967 | Ruble ................................. 423/450 |
| 3,481,865 | 12/1969 | Samuels ............................ 208/251 |
| 3,677,704 | 7/1972 | Byron ................................. 423/450 |
| 3,904,509 | 9/1975 | Anthoney .......................... 208/113 |

Primary Examiner—Edward J. Meros

[57] ABSTRACT

Oil containing carbonaceous solids is subjected to a separation step to concentrate these solids in a stream which is used as the fuel oil for a carbon black reactor. Another stream from this separation step, thus lowered in carbonaceous solids content, is used as feed oil.

6 Claims, 1 Drawing Figure

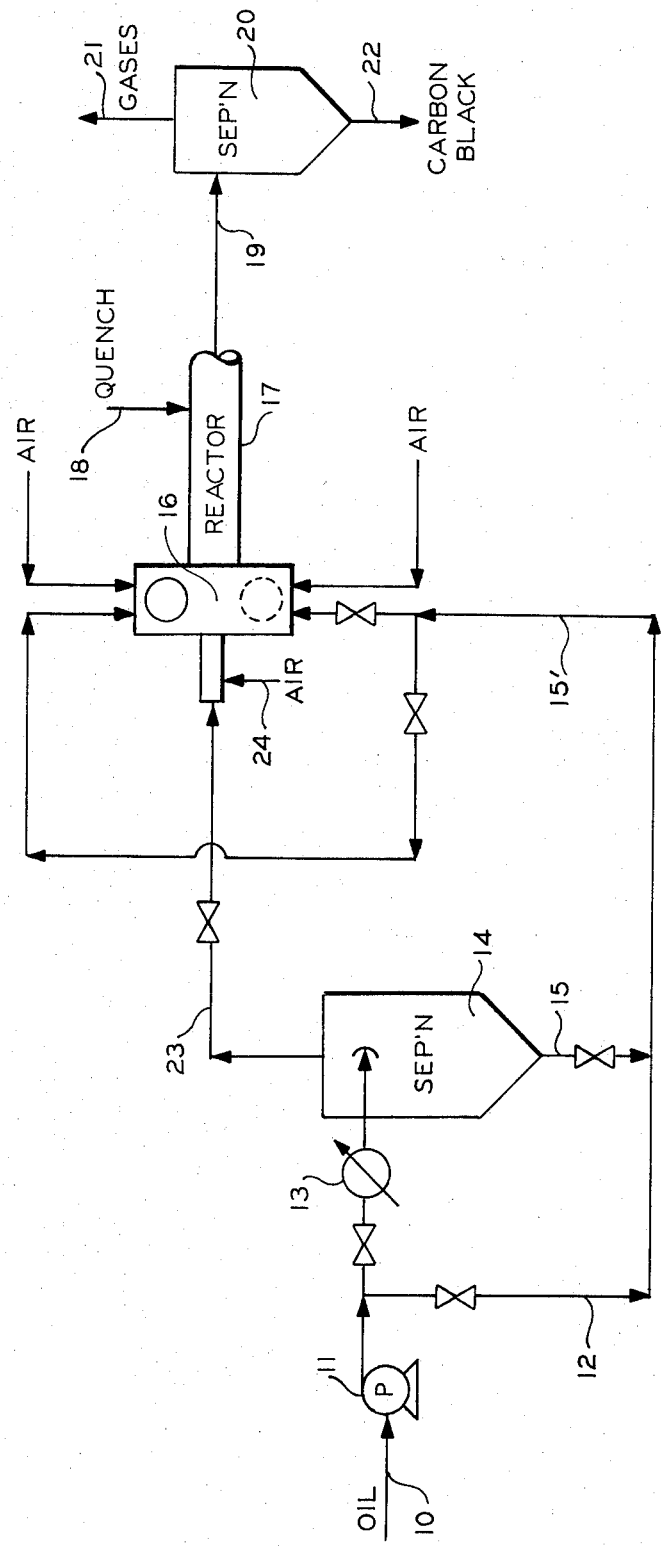

CONCENTRATION OF CARBONACEOUS SOLIDS IN FUEL OIL STREAM IN A CARBON BLACK PROCUS

BACKGROUND OF THE INVENTION

This invention relates to the production of carbon black from oil streams contaminated with carbonaceous solids.

Certain hydrocarbon oils which would otherwise be suitable for feedstocks for carbon black production contain significant amounts of carbonaceous solid particles. Carbon black made from such oil tends to have undesirable "grit" which has an adverse effect on the properties of rubber made from such carbon black.

SUMMARY OF THE INVENTION

It is an object of this invention to produce a carbon black having a reduced grit content;

It is yet a further object of this invention to utilize oil containing carbonaceous solids as a feedstock for a carbon black reactor; and It is still yet a further object of this invention to provide efficient use of oil which is otherwise unsuitable as a carbon black feedstock.

In accordance with this invention, oil containing carbonaceous solids is subjected to a separation step to concentrate these solids in a stream which is then used as fuel oil for a carbon black reactor while the remainder of the oil, now lean in carbonaceous solids, is used as a feed oil for the carbon black production.

BRIEF DESCRIPTION OF THE DRAWING

In the drawing, forming a part hereof, there is shown a schematic representation of a carbon black reactor employing the oil separation step of this invention.

DESCRIPTION OF THE PREFERRED EMBODIMENTS

In a typical carbon black reactor of the type suitable for utilizing this invention, make or feed oil is introduced axially into a reaction chamber. Fuel oil is mixed with air and burned to provide hot gases which are introduced tangentially to this reaction chamber to provide heat to decompose the feed or make oil to produce the carbon black. Such a reactor is shown in U.S. Pat. No. 3,211,532, the disclosure of which is hereby incorporated by reference. For the most part, the fuel oil is burned to provide hot combustion gases while the make or feed oil is simply decomposed to produce carbon black.

Thus, it can be seen that the present invention represents an integrated operation wherein a "dirty" oil containing unduly large amounts of carbonaceous solids is passed to a separation zone to concentrate these solids in that portion of the oil to be used as fuel for the carbon black reactor with the remainder of the oil, now lean in carbonaceous solids, being used as the feed or make oil. This oil having a reduced concentration in carbonaceous solids will then produce carbon black having a reduced content of grit.

Any oil having a relatively high concentration of carbonaceous solids is suitable for use in the invention. For instance, oils having carbonaceous solids content of greater than one percent, and even oils having a concentration of greater than ten percent, can be utilized. Many possible sources of carbon black feed oil do contain carbonaceous solids in an amount within the range of 5 to 20 weight percent and are particularly suitable for use in this invention. Exemplary of such oils are whole coal tar oil, naphtha cracker oils, gas oil cracker residue and naphtha cracker residue. Broadly then, any petroleum residual oil or coal tar residual oil or synthetic tars from catalytic or thermal cracking and the like are suitable. It is preferred that the oils have a relatively low inorganic solid content as would be exemplified by oils having a low ash. This is because noncombustible solids even if concentrated in the fuel oil still will show up in the carbon black as grit. Thus, preferably the oils will have an ash content of less than 0.1 weight percent, preferably less than 0.05 weight percent.

The separation means can be any equipment known in the art for separating solid particles from a liquid. For instance, a centrifuge or cyclone separator can be utilized. Particularly satisfactory is a bundle of small cyclone liquid-solid separators, such as a Dorr-Clone sold by Dorr-Olivar, Inc. It is not necessary to effect 100 percent separation, but only necessary to concentrate the solids in one stream which stream generally will constitute 10 to 35 volume percent of the total oil stream. A relatively simple separator can be utilized, as the other 65 to 90 volume percent of the stream which is to be used as feed or make oil can contain a small amount of the carbonaceous solids. Preferably, the make or feed stream will have a weight percentage of carbonaceous solids after separation which is less than 50 percent of that of the oil prior to separation. Since the stream into which the carbonaceous solids is concentrated constitutes a minor portion of the total oil, the carbonaceous solids content of this stream may be quite high, for instance, 25 percent or greater and can easily be as high as 35 to 50 percent.

Referring now to the drawing, a first hydrocarbon oil stream 10 containing carbonaceous solid contaminants is pumped by pump 11, a portion if desired passing via conduit 12 directly to a burner, the remainder passing via preheater 13 to separation zone 14 (centrifuge, liquid cyclone, etc.) where it is divided into a second stream having a portion of the carbonaceous solids removed and a third stream containing the thus-removed carbonaceous solids. The second stream overflow from separator 14, which overflow is now lean in carbonaceous solids, is passed axially via line 23 as the make or feed oil for the carbon black reactor. Underflow 15, enriched in carbonaceous solids which constitutes the third stream, is passed via line 15 and 15' as liquid fuel for precombustion zone 16 of carbon black reactor 17. Here the fuel oil is mixed with air, burned and hot combustion gases are introduced tangentially into the reaction zone. Conventional water quench is shown at 18 and the cooled reactor effluent is passed via line 19 to separator 20 (bag filter, cyclones, etc.). Gas is removed via line 21 and carbon black via line 22. Nozzle cooling air conventionally is added via line 24.

CALCULATED EXAMPLE

The following is a comparison of a run utilizing "dirty" oil as the feedstock, as has been done in the prior art, with a run in accordance with the invention wherein the carbonaceous solids are concentrated in the fuel oil. The invention run represents a composite of data and extrapolations from actual laboratory runs in which high and low carbonaceous solid oils had been used. Thus, the runs are labeled as calculated examples because of the composite nature of obtaining the data.

ISAF
Calculated Typical Operation

|  | Invention | Prior Art |
|---|---|---|
| Oil Feed (10), GPH | 355 | 276 |
| Boiling range, °F. | 20%  80% | 20%  80% |
|  | 229 – 1045 | 229 – 1045 |
| API at 60° F. | −5.0 | −5.0 |
| BMCI | 149 | 149 |
| Wt. % Carbonaceous Solids | 10.7 | 10.7 |
| Temperature, °F. (after preheater 13) | 392 | 392 |
| Pressure, psig (after pump) | 200 | 200 |
| Underflow (15) - 22%, GPH | 79 | X$^{(x)}$ |
| Wt. % Carbonaceous Solids | 38.5 | 10.7 |
| Overflow (23) - 78%, GPH | 276 | X |
| Wt. % Carbonaceous Solids | 2.75 | 10.7 |
| Make Oil (23), GPH | 276 | X |
| Make Oil (10), GPH | X | 276 |
| Axial Air, MSCF/H | 4 | 4 |
| Fuel Oil (15), GPH | 79 | X |
| Fuel Oil (10), GPH | X | 79 |
| Tangential Air, MSCF/H | 180 | 180 |
| Reactor: | | |
| Zone 16: | | |
| Length, Inches | 12 | 12 |
| Diameter, Inches | 37 | 37 |
| 17: | | |
| Length, feet to quench | 3 | 3 |
| Diameter, Inches | 10 | 10 |
| 2 Liquid Cyclones (14) in Parallel: |  | Not used |
| Diameter, inches | 1.0 | X |
| Height of Cylinder, inches | 3.0 | X |
| Height of Cone, inches | 2.0 | X |
| Carbon Black: | | |
| lbs./ gal. of oil | 3.9 | 3.9 |
| N$_2$SA, m$^2$/gm. | 124 | 124 |
| DBP, cc/100 gm. | 116 | 116 |
| Photelometer | 90 | 90 |
| Grit, wt. %, 325 mesh | 0.108 | 0.134 |
| Lab Abrasion in SBR-1006 (standard reference black = 100) | 106 | 68 |

$^{(x)}$No values because no separation made - the original oil was divided and charged as both make oil and fuel oil.

The above tests are all standard procedures known to those skilled in the carbon black art, and are not herein detailed.

Temperature ranges for liquid separator 14 can be ambient to up to about 600° F, depending on the oil used. Pressures can range up to 100 psig.

The amount of underflow is usually at least 10 volume percent of the feed to the separator for suitable removal of carbonaceous solids therewith. Carbonaceous solids are filterable solids present in the oil and combustible with oxygen or air to $CO_2$ and water.

While this invention has been described in detail for the purpose of illustration, it is not to be construed as limited thereby but is intended to cover all changes and modifications within the spirit and scope thereof.

I claim:

1. A process for producing carbon black having a low grit content comprising in combination:
    passing a first stream of hydrocarbon oil containing carbonaceous solid contaminants to a separation zone and therein dividing said first stream into a second stream having a portion of said carbonaceous solids removed therefrom and a third stream containing said thus-removed carbonaceous solids;
    passing said second stream to a carbon black reactor as feed oil;
    passing said third stream to said carbon black reactor as fuel oil;
    burning said fuel oil to provide hot combustion gases which are introduced into a reaction zone of said reactor;
    decomposing said feed oil in said reaction zone; and
    recovering said carbon black having a low grit content.

2. A method according to claim 1 wherein said feed oil is introduced axially into a reaction zone and said fuel oil is mixed with oxygen, burned and the combustion products introduced tangentially into said reaction zone.

3. A method according to claim 1 wherein said oil is selected from petroleum residual oils, coal tar residual oils, and synthetic tars from catalytic or thermal cracking.

4. A method according to claim 1 wherein said carbonaceous solids are concentrated in said third stream by means of a cyclone liquid-solid separator.

5. A method according to claim 1 wherein the weight percentage of said solid carbonaceous contaminants in said second stream is less than 50 percent of the weight percentage of said solid carbonaceous contaminants in said first stream.

6. A method according to claim 5 wherein said hydrocarbon oil of said first stream is selected from the group consisting of liquid petroleum residual oil, liquid coal tar residual oil, and liquid synthetic tars from catalytic or thermal cracking, and wherein said feed oil is introduced axially and said fuel oil is mixed with oxygen, burned and hot combustion gases resulting therefrom are introduced tangentially into a reaction zone.

* * * * *

UNITED STATES PATENT AND TRADEMARK OFFICE
CERTIFICATE OF CORRECTION

PATENT NO. : 3,989,803
DATED : November 2, 1976
INVENTOR(S) : Eulas W. Henderson It is certified that error appears in the above-identified patent and that said Letters Patent are hereby corrected as shown below:

On the cover page in the title, delete "PROCUS" and insert therefor --- PROCESS ---; column 1, line 3, in the title, delete "PROCUS" and insert therefor --- PROCESS ---.

Signed and Sealed this

Fourteenth Day of June 1977

[SEAL]

Attest:

RUTH C. MASON
Attesting Officer

C. MARSHALL DANN
Commissioner of Patents and Trademarks